United States Patent
Garoff et al.

(10) Patent No.: US 6,288,180 B1
(45) Date of Patent: Sep. 11, 2001

(54) PROCESS FOR THE POLYMERIZATION OF α-OLEFINS, A CATALYST USED IN THE POLYMERIZATION AND ITS PREPARATION

(75) Inventors: Thomas Garoff, Helsinki; Timo Leinonen, Tolkkinen; Sirpa Ala-Huikku, Helsinki, all of (FI)

(73) Assignee: Borealis Polymers Oy, Porvoo (FI)

( * ) Notice: Subject to any disclaimer, the term of this patent is extended or adjusted under 35 U.S.C. 154(b) by 0 days.

(21) Appl. No.: 09/147,889

(22) PCT Filed: Sep. 19, 1997

(86) PCT No.: PCT/FI97/00562

§ 371 Date: Mar. 19, 1999

§ 102(e) Date: Mar. 19, 1999

(87) PCT Pub. No.: WO98/12234

PCT Pub. Date: Mar. 26, 1998

(30) Foreign Application Priority Data

Sep. 19, 1996 (FI) ......................................................... 963707

(51) Int. Cl.$^7$ ................................. C08F 4/50; C08F 4/58
(52) U.S. Cl. ..................................... 526/123.1; 526/124.3; 526/124.5; 526/126; 526/125.3; 526/351; 526/348.6; 502/116; 502/125
(58) Field of Search ................................ 526/348.6, 351, 526/123.1, 124.3, 124.7, 124.5, 125.3, 126; 502/116, 125

(56) References Cited

U.S. PATENT DOCUMENTS

| | | | |
|---|---|---|---|
| 5,541,260 | * | 7/1996 | Pelliconi et al. ...................... 525/240 |
| 5,684,173 | * | 11/1997 | Hosaka et al. ........................ 556/482 |

FOREIGN PATENT DOCUMENTS

| | | | |
|---|---|---|---|
| 0409492 | | 1/1991 | (EP) . |
| 0 489 536 A2 | * | 6/1992 | (EP) . |
| 0489536 | | 6/1992 | (EP) . |
| 0627449 | | 12/1994 | (EP) . |
| 0665243 | | 8/1995 | (EP) . |
| 0683175 | | 11/1995 | (EP) . |
| 0728769 | | 8/1996 | (EP) . |
| 0728770 | | 8/1996 | (EP) . |

* cited by examiner

Primary Examiner—David W. Wu
Assistant Examiner—R. Harlan
(74) Attorney, Agent, or Firm—Birch, Stewart, Kolasch & Birch, LLP

(57) ABSTRACT

In the polymerization of $C_3$–$C_{12}$-α-olefins, the activity of the catalyst and the isotacticity and molecular weight of the polymer product can be adjusted and improved in a controlled manner by a new process wherein A) a catalyst system is prepared by bringing a support which comprises magnesium chloride, a derivative thereof or a reagent forming it into contact with at least titanium tetrachloride or a reagent forming it, in order to produce a titanated support; by bringing the titanated support into contact with at least a group 1, 2 or 13 metal compound which contains a $C_1$–$C_{10}$-alkyl and activates titanium tetrachloride to a catalytically active titanium group, in order to produce an activated support; and by bringing a substance selected from among the said support, titanated support and activated support into contact with at least one donor or a reagent forming it, in order to produce a catalyst system B) polymerization is carried out using the catalyst system by bringing it into contact with at least a $C_3$–$C_{12}$-α-olefin, whereupon poly-$C_3$–$C_{12}$-α-olefin chains are formed in the catalytically active titanium groups, and preferably by bringing the said catalyst system, the said $C_3$–$C_{12}$-α-olefin and the said poly-$C_3$–$C_{12}$-α-olefin chains into contact with hydrogen or some other similar chain transfer agent, whereupon a poly-$C_3$–$C_{12}$-α-olefin terminated with hydrogen or suchlike is formed.

In the process the improvement is achieved so that, in step A), i) a first controlled amount of a less soluble internal donor and a second controlled amount of a more soluble internal donor are provided on the surface of the said support, titanated support or activated support, in order to produce an internal donoration product, and ii) the internal donoration product is brought into contact with at least one eluant eluting the more soluble internal donor and with at least one external donor or a reagent forming it, in order to produce an external donoration product, the catalyst system thereby formed having at least catalytically active titanium groups, the said first controlled amount of the less soluble internal donor and the said second controlled amount comprising external donor.

37 Claims, No Drawings

PROCESS FOR THE POLYMERIZATION OF α-OLEFINS, A CATALYST USED IN THE POLYMERIZATION AND ITS PREPARATION

This application is the national phase under 35 U.S.C. §371 of prior PCT International Application No. PCT/FI97/00562 which has an International filing date of Sep. 19, 1997 which designated the United States of America.

FIELD OF THE INVENTION

The invention relates to a process for the polymerization of $C_3$–$C_{12}$-α-olefins, wherein A) a catalyst system is prepared by bringing a support which comprises magnesium chloride, a derivative thereof or a reagent forming it into contact with at least titanium tetrachloride or a reagent forming it, in order to produce a titanated support, by bringing the titanated support into contact with at least a compound of a metal of group 1, 2 or 13 of the Periodic Table of the Elements (IUPAC 1990), which compound contains a $C_1$–$C_{10}$-alkyl and activates titanium tetrachloride to a catalytically active titanium group, in order to produce an activated support, and by bringing a substance selected from among the said support, titanated support and activated support into contact with at least one donor or a reagent forming it, in order to produce a catalyst system;

B) polymerization is carried out by using the catalyst system by contacting it with at least a $C_3$–$C_{12}$-α-olefin, whereupon poly-$C_3$–$C_{12}$-α-olefin chains are formed in the catalytically active titanium groups, and preferably by contacting the said catalyst system, the said $C_3$–$C_{12}$-α-olefin and the said poly-$C_3$–$C_{12}$-α-olefin chains with hydrogen or some other similar chain transfer agent, whereby a poly-$C_3$–$C_{12}$-α-olefin terminated with hydrogen or suchlike is formed.

The invention also relates to a method for the preparation of a catalyst system intended for the polymerization of $C_3$–$C_{12}$-α-olefins, in which process a support which comprises magnesium chloride, a derivative thereof or a reagent forming it is contacted with at least titanium tetrachloride or a reagent forming it, in order to form a titanated support; the titanated support is contacted with at least a compound of the said group 1, 2, or 13 metal, which compound contains a $C_1$–$C_{10}$-alkyl and activates titanium tetrachloride to a catalytically active titanium group, in order to produce an activated support; and a substance selected from among the said support, titanated support and activated support is contacted with at least one donor or a reagent forming it, whereby the said catalyst system is formed.

By titanated support is meant a contact product of a support and titanium tetrachloride or a reagent forming it. By activated support is meant a support which has first been contacted with titanium tetrachloride or a reagent forming it, and thereafter with a metal compound which contains a $C_1$–$C_{10}$-alkyl and activates titanium tetrachloride.

Finally the invention relates to a catalyst system intended for the polymerization of $C_3$–$C_{12}$-α-olefins, the catalyst system being prepared by the above method for the preparation of a catalyst system.

1. Discussion of Related Art

The conventional process for the polymerization of poly-$C_3$–$C_{12}$-α-olefins has the disadvantage that all of the donors used therein participate in a random equilibrium system. Thus the quantity and quality of the poly-$C_3$–$C_{12}$-α-olefin fractions depending on equilibrium cannot be regulated. This has resulted, for example, in that, when the isotacticity of the product is raised by using a larger donor quantity, the hydrogen sensitivity of the catalyst system has decreased and its activity has dropped.

2. Summary of the Invention

In the said step A) of the polymerization process, when a support comprising magnesium chloride, a derivative thereof or a reagent forming is contacted with titanium tetrachloride or a reagent forming it, there is formed a titanated support having at least titanium tetrachloride coordinated to its magnesium chloride.

Thus, when the said titanated support is contacted with a metal compound containing a $C_1$–$C_{10}$-alkyl, there is formed an activated support having catalytically active titanium groups coordinated to its magnesium chloride.

Finally, when a substance selected from among the said support, titanated support and activated support is contacted with at least one donor or a reagent forming it, a catalyst system is formed the activated support of which has, coordinated in its magnesium chloride, catalytically active titanium groups and at least one type of donor.

An object of the present invention is to provide a poly-$C_3$–$C_{12}$-α-olefin as isotactic as possible, without reducing the hydrogen sensitivity or activity of the catalyst system.

The above-mentioned objects of the invention have now been achieved by a novel process for the polymerization of $C_3$–$C_{12}$-α-olefins, the process being primarily characterized in that in step A):

i) on the surface of the said support, titanated support or activated support there is provided a first controlled amount of a less soluble internal donor and a second controlled amount of a more soluble internal donor to produce an internal donoration product, and ii) the internal donoration product is contacted with at least one eluant eluting the more soluble internal donor and with at least one external donor or a reagent forming it, in order to produce an external donoration product, the catalyst system thereby formed containing at least catalytically active titanium groups, the said first controlled amount of the less soluble internal donor, and the said second controlled amount comprising the external donor.

DETAILED DESCRIPTION OF INVENTION

According to one embodiment, two eluants are used.

In this case, the internal donoration product is contacted with a first eluant, which primarily removes only the coordinated more soluble internal donor, in order to produce a first elution product, which contains, on the surface of the support, treated support, or further treated support, at least the said controlled amount of the less soluble internal donor. There-after the first elution product is contacted with at least the external donor or the reagent forming it, in order to produce an external donoration product, which contains, on the surface of the support, treated support, or further treated support, at least the said controlled amount of the less soluble internal donor and external donor, i.e. the external donor has replaced the more soluble internal donor.

Finally the external donoration product is contacted with a second eluant, which removes external donor from the surface of a support of the type concerned and yields external donor back to the surface concerned, in order to produce a second elution product, which contains, on the surface of the support, treated support or further treated support, at least the said controlled amount of the less soluble internal donor and additionally external donor in a thermodynamic equilibrium.

In the obtained catalyst system, on the surface of the support of the external donoration product or optionally the second elution product there is thus, coordinated, at least catalytically active titanium groups, the said controlled amount of the less soluble internal donor and external donor in equilibrium, the second eluant maintaining the said equilibrium.

Although it is possible in the invention to elute in step ii) substantially all of the more soluble internal donor from surface of the support concerned, according to one embodiment it is also possible in step ii) to use such an amount or type of eluant that it removes only a portion of the more soluble internal donor, in which case the catalyst system obtained contains, coordinated, a catalytically active titanium group and, in a controlled ratio, less soluble internal donor, more soluble internal donor, and external donor.

The present invention is thus based on the realization that, instead of one internal donor or a reagent forming it, two internal donors or reagents forming them are used, one of the donors being a less soluble internal donor or a reagent forming it and the other a more soluble internal donor or a reagent forming it. By contacting a substance selected from among a support, a titanated support and an activated support with the less soluble internal donor or a reagent forming it and with the more soluble donor or a reagent forming it, in a controlled ratio, and by replacing the more soluble internal donor with the external donor, the ratio desired in the given case is always obtained between the internal donor and the external donor.

As it has been observed in the invention that the different fractions of poly-$C_3$–$C_{12}$-α-olefins are adjustable and that an isotactic material can be prepared with a greater hydrogen sensitivity and a greater yield than previously, in its widest scope the invention relates only to the procedures stated in the foregoing and hereinafter.

Typical $C_3$–$C_{12}$-α-olefins usable in the polymerization process according to the invention include propylene, 1-butene, 4-methyl-1-pentene, 3-methyl-1-butene, 4,4-dimethyl-1-pentene, etc. They may also be copolymerized with one another and with other monomers, preferably ethylene. The most preferred $C_3$–$C_{12}$-α-olefin is propylene.

According to a preferred embodiment of the invention, in polymerization step B) the said catalyst system, the said $C_3$–$C_{12}$-α-olefin and the said poly-$C_3$–$C_{12}$-α-olefin chains are contacted with hydrogen or other such chain transfer agent, whereupon a hydrogen-terminated poly-$C_3$–$C_{12}$-α-olefin is formed.

In the polymerization process according to one embodiment of the invention, there are two internal donor types, of which the first is poorly soluble in trialkylaluminum and the second is more soluble in trialkylaluminum, which acts both as the activating $C_1$–$C_{10}$-alkyl metal compound and as an eluant. Thus the polymerization system is controlled and the amount of internal donor eluted by alkylaluminum is no longer random but controlled. It is to be noted in this context that the above systems also enable eluants other than trialkylaluminum to be used, a fact which in turn increases the controllability of the polymerization process. An embodiment in which at least two eluants are used has also been described above. The invention thus relates to a control method by which various desired poly-α-olefin products are achieved and not to a certain set of parameter values by the use of which only a specific poly-α-olefin product is arrived at.

Donors or reagents forming them do not compete with titanium tetrachloride or a reagent forming it for the coordination sites of magnesium chloride or a derivative thereof. Furthermore, since according to the invention it is possible to use an eluant which is not necessarily a metal compound which contains a $C_1$–$C_{10}$-alkyl and activates titanium tetrachloride, the donoration and elution steps according to the invention, described above, can be carried out completely independently of the titanation and activation. Thus, in principle the donoration/elution can be carried out on a support, a titanated support, or an activated support. Also, there is no obstacle to carrying out or continuing the donoration and elution also in the said polymerization step B).

According to one preferred embodiment of the invention, the titanation and activation of step A) are combined with one or more donoration and elution runs of steps i) and ii) according to the invention in such a manner that in step A)

i') a support which comprises magnesium chloride, a derivative thereof or a reagent forming it is contacted with at least titanium tetrachloride or a reagent forming it, with a first separate amount of a less soluble internal donor or a reagent forming it, and with a second separate amount of a more soluble internal donor or a reagent forming it, in order to produce an internally donorated and titanated support containing the said first controlled amount of the less soluble internal donor and the said second controlled amount of the more soluble internal donor. In this case the magnesium chloride of the support contains at least coordinated titanium tetrachloride and the above-mentioned less soluble internal donor and more soluble internal donor. Thereafter ii') the internally donorated and titanated support is contacted with at least a compound of a group 1, 2 or 13 metal, which compound contains a $C_1$–$C_{10}$-alkyl and activates titanium tetrachloride to a catalytically active titanium group; with at least one eluant, which may be a compound of the said metal, and with at least one external donor or a reagent forming it, in order to produce a catalyst system which contains at least catalytically active titanium groups and, in a controlled ratio, the less soluble internal donor and the external donor.

By the terms presented above, "a first separate amount of a less soluble internal donor or a reagent forming it" and "a second separate amount of a more soluble internal donor or a reagent forming it" is meant the use of two different internal donors or two different reagents forming internal donors, as a mixture or separately, or the use of the same substance separately as a reagent forming one internal donor (cf. hereinafter transesterification) and as a second internal donor. By "amount" is meant in this context the added amount, not the amount associated with the support.

According to one embodiment, the more soluble internal donor is removed and possibly equilibrated by means of one eluant and the external donor is equilibrated by means of another eluant, in which case in the above-mentioned step ii') the internally donorated and titanated support is contacted with at least a compound of a metal of group 1, 2 or 13, which compound contains a $C_1$–$C_{10}$-alkyl and activates titanium tetrachloride to a catalytically active titanium group, and with a first eluant, which primarily removes only the more soluble internal donor, in order to produce an internally donorated, eluted and activated support having catalytically active titanium groups and a poorly soluble internal donor, as well as uncoordinated coordinative sites left by the removed more soluble internal donor. Thereafter the said internally donorated, eluted and activated support is contacted with at least an external donor or a reagent forming it, which is capable of coordinating to the said coordinative sites, and with a second eluant, which removes external donor from the said coordinative sites and yields it back, in order to produce a catalyst system which has, in the magnesium chloride of its twice donorated and eluted and activated support, at least coordinated catalytically activated titanium groups and, in a controlled ratio, the less soluble internal donor and the external donor in equilibrium, the said second eluant maintaining the equilibrium.

When in step B) the said catalyst system is contacted with a $C_3$–$C_{12}$-α-olefin, there form, in the catalytically active titanium groups adjacent to the coordinated less soluble internal donor, long, completely isotactic poly-$C_3$–$C_{12}$-α-olefin chains and, in the catalytically active titanium groups adjacent to the coordinated external donor and the coordinative sites in equilibrium with it, there form isotactic chain sequences of poly-$C_3$–$C_{12}$-α-olefins or short atactic chains or chain sequences, depending on whether the external donor is respectively linked to the coordinative sites or separate therefrom.

When in step B) the said catalyst system, the said $C_3$–$C_{12}$-α-olefin and said poly-$C_3$–$C_{12}$-α-olefin chains are contacted with hydrogen or other such chain transfer agent, there occurs linking of a first atom of hydrogen to the catalytically active titanium groups adjacent to the coordinative sites and of a second atom of hydrogen to the atactic poly-$C_3$–$C_{12}$-α-olefin chains and sequences in the said groups, whereby hydrogen-terminated poly-$C_3$–$C_{12}$-α-olefin is formed.

By the use of at least two internal donors of clearly different solubilities it is thus possible better to control the polymerization process according to the invention. According to one embodiment, the proportion of purely isotactic and larger-molecule material in the poly-$C_3$–$C_{12}$-α-olefin containing it and a less isotactic and smaller-molecule material is controlled by means of the ratio of the less soluble internal donor to the more soluble internal donor so that with larger proportions of less soluble internal donor a larger proportion of purely isotactic and larger-molecule material is obtained. Respectively, with smaller proportions of less soluble internal donor a smaller proportion of purely isotactic and larger-molecule material is obtained.

Depending on whether or not, during the polymerization, the external donor participating in the equilibrium is attached to the support, alternating isotactic and atactic sequences are formed. Since chain transfer by means of hydrogen occurs only at the stage of growth of atactic sequences, isotactic sequences are in general longer than atactic sequences. According to one embodiment of the invention, the proportion of isotactic material in the form of chain sequences in the less isotactic and smaller-molecule (thus not purely isotactic) material of poly-$C_3$–$C_{12}$-α-olefin is controlled by means of the ratio of the external donor to the second eluant so that with a larger amount of external donor in proportion to the second eluant a larger proportion of an isotactic and larger-molecule material in the form of sequences is obtained. Thus there forms a material which is isotactic but at the same time more hydrogen-sensitive than when a large amount of the less soluble internal donor is used. Respectively, when less eluant and more external donor is used, a larger proportion of atactic and smaller-molecule material in the form of sequences is obtained. Thus there also forms a larger amount of the said xylene-soluble, completely atactic material having a very small molecular size.

Above, the control of the different fractions of poly-$C_3$–$C_{12}$-α-olefins by means of donors and eluants, in accordance with the invention, has been described. The said fractions can also be affected by means of other parameters, such as the reaction time, the reaction temperature and the amount of the chain transfer agent, such as hydrogen. It is thus preferable to adjust the length and molecular weight of the chain sequences and/or chains of the less isotactic and smaller-molecule material of the poly-$C_3$–$C_{12}$-α-olefin by means of hydrogen and/or the temperature so that with a lower hydrogen amount and a lower temperature a higher molecular weight is obtained, and vice versa. The molecular weight is in general measured by using the melt index, MFR, a lower MFR being obtained with higher molecular weights.

A wide molecular weight distribution can be achieved by using, for example, approximately equal amounts of the less soluble internal donor and the external donor, the latter splitting off in a state of equilibrium, whereupon approximately equal amounts of a larger-molecule isotactic material and a smaller-molecule atactic material are formed. Furthermore, the molecular weight of the atactic material can be decreased further by using a large amount of hydrogen. By the control method according to the invention, poly-α-olefins suitable for different uses can thus be obtained.

In steps i) and i') stated above, the said less soluble internal donor is preferably a Lewis base less soluble in a hydro-carbon. Internal donors are well known in the art, and lists thereof have been presented widely in the patent literature and in scientific literature. Thus a person skilled in the art will know what is meant by an internal donor. The internal donor is thus a Lewis base, which means that its molecule has one or more electron-donor heteroatoms, such as oxygen, nitrogen, phosphorus or sulfur atoms. In general, bidentate (=two electron-donor heteroatoms) Lewis bases are used in the polymerization of poly-$C_3$–$C_{12}$-α-olefins, and thus it is advantageous to use a bidentate Lewis base poorly soluble in a hydrocarbon. Respectively, the more soluble internal donor is preferably a Lewis base more soluble in a hydrocarbon, most preferably a bidentate Lewis base more soluble in a hydro-carbon. By "less soluble" and "more soluble" are meant within the widest scope of the invention materials that are less soluble or more soluble than the other in the eluant used. It is clear that, when an eluant is added according to the invention, the purpose is in general to remove the more soluble internal donor but to leave as much as possible (preferably all) of the less soluble internal donor in the solid catalyst.

According to one preferred embodiment, the less soluble internal donor is a $C_1$–$C_6$-alkyl ester of an organic carboxylic acid, preferably a $C_1$–$C_4$-alkyl ester of an organic dicarboxylic acid, and most preferably diethyl phthalate. It is known that a low-alkyl diethyl phthalate attached to a solid catalyst is very difficult to elute. This may be due to the fact that the small alkyl groups, i.e. ethyls, of phthalate are not solvated as strongly with a hydrocarbon solvent or a hydrocarbon-containing solvent, i.e. the eluant, as are the larger alkyls of a phthalate. When phthalates are used, the preferred difference in the alkyls between the less soluble and the more soluble internal donors is at least 3, preferably at least 6, carbon atoms.

Since it is difficult to attach di-$C_1$–$C_4$-alkyl phthalate, preferably diethyl phthalate, directly to a support, a titanated support or an activated support, it can advantageously be formed by using as the magnesium chloride derivative in step i) or i') a complex according to Formula I:

$$MgCl_2 \cdot nROH \hspace{2cm} (I)$$

where ROH is an aliphatic $C_1$–$C_4$-alcohol, preferably ethanol, or a mixture of such alcohols, n is 1–6, preferably approx. 3. A di-$C_7$–$C_{20}$-alkyl phthalate, preferably dioctyl phthalate, is used as the reagent forming the less soluble internal donor. Thereafter they are transesterified to a di-$C_1$–$C_4$-phthalate, preferably diethyl phthalate, coordinated to magnesium chloride, and to a removable $C_7$–$C_{20}$-alcohol byproduct, preferably octanol. Transesterification can be effected not only by the above-mentioned reagent selection but also by using a high temperature, i.e. a temperature of approx. 128–200° C., preferably approx. 130–150° C.

According to one preferred embodiment, the more soluble, i.e. elutable, internal donor or step i) and i') is a $C_7$–$C_{20}$-alkyl ester of an organic carboxylic acid, preferably a di-$C_8$–$C_{16}$-alkyl ester of organic dicarboxylic acid, such as dioctyl phthalate, dinonyl phthalate, didecyl phthalate, diundecyl phthalate, didodecyl phthalate, ditridecyl phthalate or ditetradecyl phthalate. The most preferable phthalate is dioctyl phthalate. Since the low solubility of the less soluble internal donor was probably due to the short alkyl group of the phthalate, the higher solubility of the more soluble internal donor is most likely respectively due to the greater length of the alkyl group of the phthalate, enabling the donor to be solvated by a hydrocarbon and be removed.

Since the substance forming the less soluble internal donor may be the more soluble internal donor, the first-mentioned internal donor can advantageously be prepared by partial transesterification. In this case the said controlled amounts of the less soluble and more soluble internal donor are obtained by carrying out the said transesterification in a limited manner, in which case the unreacted amount of di-$C_7$–$C_{20}$-alkyl phthalate constitutes the said amount of the more soluble donor. Preferably the limited transesterification is carried out by adjusting the ratio of the complex to di-$C_7$–$C_{20}$-alkyl phthalate, the reaction temperature and/or the pressure.

It is preferable to use in step i) and i') a molar ratio of the less soluble+the more soluble internal donor to magnesium which is within a range of 0.10–0.50, preferably 0.10–0.40, and most preferably 0.15–0.30.

As was pointed out above, the one or more eluants in step ii) and ii') may either be a separate eluant or be of the same metal compound which contains $C_1$–$C_{10}$-alkyl and activates coordinated titanium tetrachloride to a catalytically active titanium group. The eluant is thus an organic substance which dissolves the more soluble internal donor but does not dissolve the less soluble internal donor. Thus the more soluble internal donor and the less soluble internal donor together with the eluant form a dissolution system which elutes out most or all of the more soluble internal donor but leaves most of the less soluble internal donor in the support, the titanated support or the activated support. By organic material is meant in this context both purely organic and organometallic materials.

According to one preferred embodiment, the eluant is a group 1, 2 or 13 metal compound which contains a $C_1$–$C_{10}$-alkyl, preferably such an excess of the metal compound containing a $C_1$–$C_{10}$-alkyl, and being used in step A) for activation purposes, that it does not participate in the activation of the coordinated titanium tetrachloride to a catalytically active titanium group. A preferred eluant is tri-$C_1$–$C_{10}$-alkylaluminum, a more preferable eluant is tri-$C_1$–$C_6$-alkylaluminum, and the most preferred is tri-$C_1$–$C_4$-alkylaluminum, such as triethylaluminum. The molar ratio Al/Ti is preferably within a range of 1–2000, preferably within a range of 50–500, and most preferably within a range of 100–200.

In steps ii) and ii') a treatment with an external donor and an eluant is carried out. The said external donor is according to a preferred embodiment a Lewis base partly soluble in hydrocarbon, and preferably a bidentate Lewis base partly soluble in hydrocarbon. By "partly soluble" is meant that the external donor is partly attached to a solid catalyst and partly, eluted by the said eluant, in solution, i.e. the external donor, together with the catalyst and the eluant, forms an equilibrium system. The external donor is a typical external donor used in the art. Lists of external donors can be found in the literature of the field, and a person skilled in the art will be capable of selecting from them suitable external donors the solubility of which corresponds to the criteria stated above. A typical external donor is a dialkyl-dialkoxysilane, such as cyclohexyl-methyl-dimethoxysilane.

As was pointed out, in the process according to the invention for the polymerization of $C_3$–$C_{12}$-α-olefins, such as propylene, a support is used which comprises magnesium chloride, a derivative thereof or a reagent forming it. The support itself may be magnesium chloride, a derivative thereof or a reagent forming it, or the support may be, for example, of an inert substance, such as an inorganic oxide, coated with magnesium chloride, a derivative thereof or a reagent forming it. Some typical inert supports are silica, alumina, their mixtures or mixed oxides with each other or with other oxides. A preferred magnesium chloride is β-magnesium chloride, which coordinates titanium tetrachloride well. β-magnesium chloride is formed, for example, by grinding or through chemical reactions. Examples of derivatives of magnesium chloride include its complexes with alcohols and examples of reagents forming magnesium chloride include alkyl magnesium compounds and magnesium alkoxy compounds, which together with a chlorinating substance form β-magnesium chloride. According to a preferred embodiment, the magnesium chloride derivative comprised by the support is a complex according to generic Formula (I)

$$MgCl_2 \cdot nROH \qquad (I)$$

where ROH is an aliphatic $C_1$–$C_4$ alcohol or a mixture of such alcohols, and n is 1–6, preferably approx. 3, in which case in step A) this complex is caused to react with titanium tetrachloride or a complex forming it. R is preferably methanol and/or ethanol, most preferably ethanol.

A. typical reaction in which a reagent according to Formula (I) reacts with titanium tetrachloride occurs according to the following reaction equation:

$$MgCl_2 * EtOH + 3TiCl_4 = MgCl_2 * 3TiCl_3OEt + 3HCl$$

where Et is the ethyl group $C_2H_5$. It should be pointed out that the alcohol, which is sometimes called an electron donor in the literature, is not an internal electron donor, since it leaves the catalyst system during titanation. The same, of course, concerns all compounds reacting in this manner.

In this reaction, three moles of $TiCl_3OEt$ are formed for each mole of $MgCl_2$. The $TiCl_3OEt$ formed must be removed by washing as completely as possible, since this byproduct is a catalyst poison in the polymerization of propylene or any other $C_3$–$C_{12}$-α-olefin. Therefore the reaction is performed in the presence of a large $TiCl_4$ excess, the hot $TiCl_4$ washing out the $TiCl_3OEt$ byproduct. According to a preferred embodiment, titanium tetrachloride or a reagent forming it is used in such an excess that the molar ratio Ti/Mg=1–100, preferably 5–40, most preferably 10–25.

In the titanium chloride wash, magnesium chloride in its coordinative form, i.e. β-form, is released according to the following reaction equation:

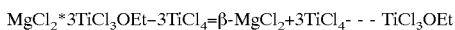

MgCl$_2$*3TiCl$_3$OEt–3TiCl$_4$=β-MgCl$_2$+3TiCl$_4$- - - TiCl$_3$OEt

A portion of the titanium tetrachloride coordinates to β-MgCl$_2$ and forms active centers during activation. To make the titanium tetrachloride wash more effective, preferably at least two, and most preferably three, titanium tetrachloride treatments are used.

By the reagent which forms titanium tetrachloride used in the titanation is meant, for example, titanium alkoxide or titanium alkoxychloride, which together with a chlorination reagent form titanium tetrachloride which can be activated.

According to a preferred embodiment of the invention, in step A) at least three steps are performed, in the first of which the support is contacted with titanium tetrachloride or a reagent forming it and with the less soluble internal donor or a reagent forming it; in the second the solid obtained from the first step is contacted with titanium tetrachloride or a reagent forming it and with the more soluble internal donor or a reagent forming it; and in the third the solid obtained from the second step is contacted with titanium tetrachloride or a corresponding washing solvent.

Most preferably, in the first step a complex of magnesium chloride and alcohol (cf. Formula (I) above) is used as the magnesium chloride derivative and di-C$_7$–C$_{20}$-alkyl phthalate as the reagent forming the less soluble internal donor, and the conditions used are such that, in the first step, there occurs forming and linking in situ of the less soluble internal donor (cf. transesterification above), in which case, in the second step, the second, more soluble internal donor is linked to the solid catalyst intermediate by normal coordination. Preferably the said steps are combined, i.e. a partial transesterification to a less soluble C$_1$–C$_4$-alkyl ester and a more soluble C$_7$–C$_{20}$-alkyl ester is carried out.

In step A) of the process according to the invention, the preferable molar ratio of the less soluble internal donor to magnesium is within a range of 0.05–0.30, most preferably within a range of 0.10–0.20. When step A) is carried out in three steps, it is preferable to use in the first step a molar ratio of the less soluble internal donor to magnesium which is within a range of 0.05–0.30, preferably within a range of 0.10–0.20. Respectively, it is advantageous to use in general, and preferably in the said second step, a molar ratio of the more soluble internal donor to magnesium which is within a range of 0.05–0.30, most preferably within a range of 0.10–0.20. Most preferably, substantially equal amounts of the less soluble and of the more soluble internal donor are used, i.e. the molar ratio of the less soluble internal donor to the more soluble internal donor is preferably within a range of 0.5–2.0, more preferably within a range of 0.7–1.3, and most preferably approx. 1.0.

In the step in which the coordinated titanium tetrachloride is activated by means of a group 1, 2 or 13 metal compound containing a C$_1$–C$_{10}$-alkyl it is preferable to use a compound which reduces and C$_1$–C$_{10}$-alkylates the coordinated titanium tetrachloride to a catalytically active titanium group. Thereby the titanium tetrachloride is reduced and the C$_1$–C$_{10}$-alkyl group of the said metal compound links to it; during the polymerization, C$_3$–C$_{12}$-α-olefin monomers are linked to the C$_1$–C$_{10}$-alkyl group.

These compounds, defined as cocatalysts, which are capable of reducing and alkylating titanium tetrachloride to a catalytically active titanium group, are well known in he art. A typical metal compound which contains C$_1$–C$_{10}$-alkyl is a tri-C$_1$–C$_{10}$-alkylaluminum, preferably a tri-C$_1$–C$_6$-alkylaluminum, and most preferably a tri-C$_1$–C$_4$-alkylaluminum, such a triethylaluminum. When reagents to be chlorinated, forming magnesium chloride and/or titanium chloride, are used, it is possible to use C$_1$–C$_{10}$-alkylaluminum chlorides, which both activate and chlorinate the said reagents. A preferred Al/Ti molar ratio is 1–2000, more preferable 50–500, and the most preferable 100–200.

As was mentioned at the beginning, the invention relates not only to the polymerization process described above but also to a method for the preparation of the catalyst system used in the polymerization and to the said catalyst system. The catalyst system according to the invention and its preparation are evident from the polymerization process described above, if steps A), i), i'), ii), and ii') of the polymerization process are taken into account. In this context we also refer to accompanying claims 24 and 25.

Experiments, in which 21 examples were performed, are described below. The description is of the empirical progress towards the invention, and thus Examples 1–4, A and J are reference examples, whereas Examples 5, 6 and B–O describe the present invention, using two internal donors D$_1$.

EXAMPLES

In the research, larger donor amounts in one and the same titanation step (cf. for example 1 and 2) and different donor amounts in two successive titanation steps were used. The investigation thus related not only to the effect of increasing donor amounts in one and the same titanation step but also to their division among different titanation steps.

In Reference Examples 1 and 2 of the preliminary experiment series, an investigation was made whether it was possible to use larger donor amounts together with transesterification to raise the isotacticity index II without a decrease in the hydrogen sensitivity (MFR) or the activity of the catalysts. In these experiments, two normal titanation runs were performed, an internal donor being added to the first of them and the second one being carried out as a washing step without a donor. The ratio of internal donor D$_1$ to magnesium Mg used was D$_1$/Mg=0.15 and 0.3 (Examples 1 and 2).

In Reference Example 3 of the preliminary experiment series, three titanation steps were experimented with; only to the first of them was one type of internal donor added to investigate whether it was possible to wash off the detrimental byproducts of catalyst preparation without the isotacticity index II decreasing owing to the repeated titanium tetrachloride washes.

In Reference Example 4, the increasing of the donor amount in comparison to Example 3 in the first titanation step of the titanation was experimented with in order to determine whether such a procedure would provide any advantages with respect to the isotacticity—hydrogen sensitivity—activity equilibrium. In this example, a D$_1$/Mg ratio of 0.3 was used.

In Embodiment Example 5, two internal donors were added in different steps, in the first titanation step and in the second titanation step, whereas the third titanation step, i.e. rinsing titanation, was carried out using titanium tetrachloride without an addition of internal donor. The idea of two internal donors according to the invention was thus implemented in these examples. The adding of the less soluble internal donor in the first step was carried out by transesterifying the alcohol of MgCl$_2$.nROH and an added substance forming the first internal donor, this substance being dioctyl phthalate (DOP), whereby diethyl phthalate (DEP) was obtained, which adhered strongly to the catalyst. The more soluble internal donor (DOP) was added in connection with the second titanation step, without transesterification, whereupon the DOP could be eluted out. In this manner, the system of two donors according to the invention is formed, of which donors one is easily eluted and the other is closely linked to a solid catalyst component, in which case there are better possibilities for controlling the hydrogen sensitivity of the catalyst and the isotacticity, molecular weight and molecular weight distribution of the polymer.

In Embodiment Example 6, the more soluble internal donor used was a compound having a larger hydrocarbon group (in the case of esters, the alkyl group of the alcohol residue). In this example, the aim was also to determine whether these larger molecules could be used in the second donor addition to produce a more soluble activation byproduct $TiCl_3$-OR. Thus, in Example 2, dioctyl phthalate (DOP) was used as the reagent forming the less soluble internal donor (DEP) and diundecyl phthalate (DUP) was used as the more soluble internal donor.

Preparation of Procatalyst

Unless otherwise mentioned, the procatalyst was prepared according to the following recipe:

45 g of $MgCl_2.3EtOH$ support was introduced into the synthesis reactor together with 150 ml of heptane. The slurry was cooled to −10° C. (stirrer speed was 200 rpm). 300 ml of cold (−12° C.) titanium tetrachloride $TiCl_4$ was added into the reactor. The molar ratio $TiCl_4$/EtOH was 4.8. The temperature was raised within 3 hours to 20° C. Thereafter a compound forming the internal donor was added, the compound being dioctyl phthalate (DOP). The amount of dioctyl phthalate added during the first titanation is shown in Table 1. The temperature of the mixture was thereafter raised to 130° C. After 1.5 hours the liquid was removed and the temperature was lowered to 120° C. After an addition o f fresh titanium tetrachloride ($TiCl_4$) (300 ml), the temperature was maintained at 120° C. for one hour. In Examples 7–10 the second internal donor was add ed after the said second titanium tetrachloride amount had been added. In Examples 4–10 a third titanium tetrachloride treatment was carried out after the said second titanium tetrachloride treatment. Finally the catalyst was washed 3 times with 300 ml of hot heptane (>90° C.) and was dried by blowing nitrogen through the catalyst bed until the catalyst turned into a freely flowing powder.

Bulk Homopolymerization of Propylene

Propylene was polymerized in a stirred tank reactor having a volume of 5 liters. 0.6 ml of triethylaluminum cocatalyst (TEA), approx. 0.2 ml of a 25 wt. % n-heptane solution of cyclohexyl-methyl-dimethoxysilane (external donor), and 30 ml of n-heptane were mixed together and were reacted for 5 minutes. One-half of the mixture was fed into the polymerization reactor and the other half was mixed with approx. 20 mg of the above-mentioned procatalyst. After another 5 minutes the procatalyst/TEA/external donor/n-heptane mixture was fed into the polymerization reactor. The Al/Ti molar ratio was 500 and the ratio Al/external donor was 20 mol/mol. 70 mmol of hydrogen and 1400 g of propylene were fed into the reactor, and the temperature was raised within 15–30 minutes to the desired polymerization temperature of 70° C. The polymerization time was 60 min, whereafter the formed polymer was withdrawn from the reactor. The isotacticity index II and melt index $MFR_2$ (g/10 min, with a load of 2.16 kg) of the polymer were determined.

Results

Below is a description of the six laboratory catalyst synthesis experiments describing the synthesis differences when a shift is made from two to three titanations, from 0.15 to 0.30 $D_1$/Mg addition, and from one to two donor additions.

Table 1

Results of bulk homopolymerization of propylene when 2 or 3 titanations (titanium tetrachloride treatments), $D_1$/Mg= 0.15 and 0.3, and the addition of 1 or 2 donors are used.

| Quantity | Ref. Ex. 1 | Ref. Ex. 2 | Ref. Ex. 3 | Ref. Ex. 4 | Ex. 5 | Ex. 6 |
|---|---|---|---|---|---|---|
| Titanation times | 2 | 2 | 3 | 3 | 3 | 3 |
| Donor | DOP | DOP | DOP | DOP | 2*DOP | DOP + DUP |
| $D_1$, $D_1$/Mg, mol/mol | 0.15 | 0.3 | 0.15 | 0.3 | 0.15 + 0.15 | 0.15 + 0.15 |
| Activity kg/g cat. | 24.1 | 24.6 | 44.9 | 34.3 | 38.5 | 45.3 |
| II % | 96.8 | 98.3 | 96.2 | 98.0 | 97.3 | 98.2 |
| $MFR_2$, g/10 min | 6.4 | 4.4 | 7.3 | 4.7 | 7.3 | 8.2 |

Examination of the Results

Reference Example 1. In this example, which represents the classical synthesis, two titanation runs and a $D_1$/Mg ratio of 0.15 are used. Owing to the low washing efficiency, the activity is only of the order of 25 kg PP/g cat, and owing to the low donor concentration, the isotacticity index II % is lower than 97%. (It can be assumed that the slightly higher MFR is due to the corresponding isotacticity.)

Reference Example 2. When an attempt is made to correct the situation in Example 1 with respect to isotacticity by raising the donor amount to 0.3, isotacticity rises to a good value of 98.3, but at the same time hydrogen sensitivity decreases (molecular weight is not decreased, i.e. MFR does not rise), since a larger amount of well-attaching DEP takes up donor sites in the catalyst, and only a lower number of active sites are involved in the hydrogen-sensitive equilibrium of the external donor. This is seen as a low melt index (MFR=4.4). The large amount of DEP also has the effect that activity remains low.

Reference Example 3. When a third titanation is added to the synthesis, the washing efficiency increases. Owing to the improved washing efficiency, the byproduct, $TiCl_3OEt$, of the procatalyst is washed out more effectively, and thus the poison effect of this byproduct on the catalyst is reduced. This is seen as a considerable increase in activity (A=44.9). The efficient wash is also seen as a lower donor concentration in the catalyst, which leads to lower isotacticity. The smaller donor amount, for its part, is seen as a higher hydrogen sensitivity, since a larger number of active sites are now involved in the equilibrium of the external donor (MFR=7.3).

Reference Example 4. If the situation in Example 3 is corrected by adding a larger amount of donor (0.3 DOP), a clearly higher DEP concentration in the catalyst (DEP= 10.9), i.e. a more complete transesterification, is achieved. This leads to a slight decrease in activity as compared with Example 3, owing to the high DEP concentration. The high DEP concentration is also seen as a high isotacticity (98.0%) and also as a lower melt index. It can be assumed that hydrogen sensitivity decreases as a large amount of internal donor remains attached to the catalyst. The low MFR obtained in the experiment is due to this.

Example 5. In the fifth experiment, it was investigated whether the donor composition could be changed by adding the DOP donor in two steps. This was possible, since there was still a third titanation available for the washing. The DOP amount added was the same as in Example 4, but it was added in two equal batches, to the first and the second titanation steps. The result showed that the DEP amount obtained by transesterification halved to 4.3, and the amount of DOP obtained by coordination increased to 8.8%. This corresponded to the expectations. Washing became more effective, since the titanium concentration decreased 1.9%. The efficient $TiCl_3OEt$ wash and the slight DEP amount increased the activity to 38.5 kg PP/g cat. The DEP+DOP mixture which was obtained by using this synthesis modification proved to be effective in increasing both isotacticity and hydrogen sensitivity, the II % being 97.3 and the MFR being 7.3. The experiment showed that with this combination a sufficient isotacticity is achieved, but additionally the conditions are good for the elution of internal donor during the polymerization, whereupon an equilibrium interaction is achieved between the detaching donor and the free site, thus making hydrogen termination possible.

Example 6. The last experiment was carried out as in Example 5, except that the DOP used in the second donor addition was replaced with DUP. The results of this experiment emphasized what had been achieved in Experiment 5. The Ti % decreased further down to 1.5%, showing that the washing efficiency provided by this method was advantageous. The DEP amount also decreased to 3.6%, and the remaining DUP concentration was 6.5%. Thus the total amount of donor in this catalyst was clearly less. This was seen as a high activity (45.3 kg PP/g cat). The DEP-DUP donor pair additionally provided a very favorable isotacticity protection and made an effective donor equilibrium possible during polymerization, thus producing a high hydrogen sensitivity. Isotacticity increased to 98.2%, and MFR was 8.2.

Trial Run Series

After the laboratory-scale experiments 1–6, three full-scale trial run series were also carried out (respectively Examples A–D, F–H and J–O). In the laboratory, three series of catalysts were prepared, in which there was made a gradual shift from a donor addition in the first titanation (titanation I) to a donor addition in the second titanation (titanation II). All of the catalysts were prepared in completely inert conditions. First, 300 ml of $TiCl_4$ was added to a reactor and was cooled to −20° C. 150 ml of heptane and thereafter 25 g of $MgCl_2*3EtOH$ support were fed into another reactor. This slurry was also cooled to −20° C. The first titanation was initiated by bringing both of the above-mentioned cooled liquids together and by allowing them to react with each other.

Thereafter the temperature was raised to +20° C. and the first donor addition was done. Thereafter the temperature was raised to 130° C., at which the first titanation (transesterification) was carried out in 1.5 hours. Thereafter the titanation solution was replaced with 200 ml of fresh $TiCl_4$. The second donor addition was done into the new mixture. The second titanation (only coordination) took place at 120° C. for 0.5 hour.

The third titanation took place in the same manner, with the difference that no donor was added.

After the $TiCl_4$ treatment, the procatalyst was washed four times with 400 ml of heptane, 90° C., 15 minutes. The procatalyst was dried in a nitrogen flow. Polymerization was carried out in the same manner as in the preliminary experiment series.

In the first trial series (B–D; A is a reference example), in the first titanation a di-2-ethyl-hexyl phthalate (DOP) donor and transesterification conditions were used. In the second titanation, diundecyl phthalate (DUP) was added in coordinating conditions. The total donor amount, i.e. the sum of the donor amounts of the first and second additions, was the same in all of the experiments. Calculated in moles, the donor amount was 0.3 in proportion to magnesium, i.e. the donor/Mg molar ratio was 0.3. The DOP, which was added in the first titanation, became transesterified to diethyl phthalate (DEP) owing to the high temperature. The DUP, added in the second titanation, did not become transesterified, since the temperature in the second titanation was lower than in the first titanation. Table 1 shows the donor addition ratios in the first trial series. Table 2 lists the donor compositions of the catalysts after the synthesis, and Table 3 lists the polymer melt indices ($MFR_2$, g/10 min with a load of 2.16 kg), obtained by test polymerizing the catalysts in question.

TABLE 1

Donor amounts added in the first trial series

| Catalyst | DOP/Mg Titanation I | DUP/Mg Titanation II |
|---|---|---|
| Reference example A | 0.3 | 0.0 |
| B | 0.25 | 0.05 |
| C | 0.10 | 0.20 |
| D | 0.05 | 0.25 |

TABLE 2

Donor compositions in the catalysts after synthesis

| Catalyst | DEP wt. % | DEP mol. % | DUP wt. % | DUP mol. % |
|---|---|---|---|---|
| Ref. A | 10.9 | 0.049 | 0 | 0 |
| B | 8.5 | 0.038 | 3.0 | 0.006 |
| C | 2.1 | 0.009 | 8.0 | 0.017 |
| D | 1.2 | 0.005 | 13.6 | 0.029 |

TABLE 3

Melt indices (MFR) of the polymers

| Catalyst | MFR |
|---|---|
| Ref. A | 4.7 |
| B | 5.0 |
| C | 6.7 |
| D | 8.0 |

The results show that a clearly increasing hydrogen sensitivity (MFR) was achieved in the catalysts when a shift was made from only transesterified, well attached internal donor to a donor mixture which also contained a more easily detaching internal donor. In almost all of the catalysts the activity was at a satisfactory level, being around 30 kg/g cat. In the example in which diundecyl phthalate was added to the second titanation (not shown in the table), an activity was observed which remained at a lower level. A slight decrease in isotacticity was observed, from 98% to slightly below 97%. However, this decrease in isotacticity is not significant in an industrial process.

In the second trial series, DOP was used in both donor additions (transesterification and coordination). Table 4 lists the donor amounts added, Table 5 lists the donor composi tions in the catalysts after synthesis, and Table 6 lists the melt indices (MFR) of the polymers.

TABLE 4

Donor amounts added in the second trial series

| Catalyst | DOP/Mg Activation I | DOP/Mg Activation II |
|---|---|---|
| Reference example A | 0.3 | 0.0 |
| F | 0.2 | 0.1 |
| G | 0.15 | 0.15 |
| H | 0.05 | 0.25 |

TABLE 5

Donor compositions in the catalysts

| Catalyst | DEP wt. % | DEP mol. % | DOP wt. % | DOP mol. % |
|---|---|---|---|---|
| Ref. A | 10.9 | 0.049 | 1.3 | 0.003 |
| F | 7.5 | 0.034 | 6.9 | 0.018 |
| G | 4.3 | 0.019 | 8.8 | 0.023 |
| H | 1.1 | 0.005 | 10.4 | 0.027 |

TABLE 6

Melt iridices (MFR) of the polymers

| Catalyst | MFR |
|---|---|
| Ref. A | 4.7 |
| F | 4.5 |
| G | 7.3 |
| H | 6.8 |

The results show that an increasing hydrogen sensitivity was achieved in the catalyst series when the well-attaching internal donor (DEP) was partly replaced with an easily detached internal donor (DOP). The isotacticity values in all of the polymers were very good, all being around 98%. The activities were of the normal level, around 30 kg/g cat. In an example in which DOP was added only to the second titanation, a decrease in activity was observed (the example is not shown in the table).

In the third trial series, the first donor addition was maintained constant; the DOP(DEP)/Mg ratio in this addition was 0.15. The donor addition of the second activation was increased gradually from 0.0 up to 0.3. Table 7 lists the donor additions to the synthesis, Table 8 lists the donor compositions of the catalysts after the synthesis, and Table 9 lists the polymer melt indices obtained when the catalysts of this series were test polymerized.

TABLE 7

Donor additions in the third trial series

| Catalyst | DOP/Mg Activation I | DOP/Mg Activation II |
|---|---|---|
| J (reference) | 0.15 | 0.0 |
| K | 0.15 | 0.05 |
| L | 0.15 | 0.10 |
| G | 0.15 | 0.15 |
| M | 0.15 | 0.20 |
| N | 0.15 | 0.25 |
| O | 0.15 | 0.30 |

TABLE 8

Donor compositions in the catalysts in the third trial series

| Catalyst | DEP wt. % | DEP mol. % | DOP wt. % | DOP mol. % |
|---|---|---|---|---|
| J | 5.3 | 0.024 | 1.3 | 0.003 |
| K | 5.0 | 0.023 | 4.2 | 0.011 |
| L | 4.7 | 0.021 | 4.8 | 0.012 |
| G | 4.3 | 0.019 | 8.8 | 0.023 |
| M | 3.9 | 0.018 | 9.5 | 0.024 |
| N | 5.1 | 0.023 | 16.6 | 0.043 |
| O | 3.8 | 0.017 | 17.2 | 0.044 |

TABLE 9

Melt indices of the polymers in the third trial series

| Catalyst | Melt index (MFR) |
|---|---|
| J | 7.3 |
| K | 6.6 |
| L | 6.7 |
| G | 7.3 |
| M | 8.0 |
| N | 8.4 |
| O | 9.9 |

The results showed that also in the third trial series an increasing hydrogen sensitivity was achieved in the catalysts, although the change was not as great as in the first two trial series, owing to the constant DOP addition to the first activation. Isotacticity was consistently around 97% in most of the trial series; only at the extreme points (J, O) was a slightly lower isotacticity (96%) obtained. The activities remained at a satisfactory level throughout the trial series, and were all around 30 kg PP/g cat.

The experiments described above show clearly that the catalyst synthesis of two internal donors according to the present invention provides a catalyst system is obtained which yields high isotacticity values while activity and hydrogen sensitivity (→lower molecular weight, higher MFR) remain high.

What is claimed is:

1. A process for the polymerization of $C_3$–$C_{12}$-α-olefins which comprises:

A) preparing a catalyst system by bringing a support which comprises a magnesium chloride-alcohol complex of the formula:

$MgCl_2 \cdot nROH$ wherein ROH is a $C_1$–$C_4$ alcohol and n is 1–6, into contact with at least titanium tetrachloride or a reagent forming it, in order to produce a titanated support; bringing the titanated support into contact with at least a group 1, 2 or 13 metal compound which contains a $C_1$–$C_{10}$-alkyl and activates titanium tetrachloride to a catalytically active titanium group, in order to produce an activated support; and bringing a substance selected from among the said support, titanated support and activated support into contact with at least one donor or a reagent forming it, in order to produce a catalyst system, wherein i) a first amount of a less soluble internal donor, which is a di-$C_1$–$C_4$-alkyl phthalate, obtained by transesterifying said magnesium chloride-alcohol complex at approximately 128–200° C. and a di-$C_7$–$C_{20}$-alkyl phthalate with said di-$C_1$–$C_4$-alkyl phthalate coordinated to magnesium chloride, and a second amount of a more soluble internal donor, which is a $C_7$–$C_{20}$-alkyl ester of an organic carboxylic acid, are provided on the surface of the said support, titanated support or inactivated support, in order to produce an internal donoration product, and;

ii) the internal donoration product is brought into contact with at least one eluant eluting the more soluble internal donor and with at least on external donor or a reagent forming it, in order to produce an external donoration product, the catalyst system thereby formed having at least catalytically active titanium groups, the said first amount of the less soluble internal donor and the said second amount comprising external donor; and B) carrying out polymerization using the catalyst system by bringing it into contact with at least a $C_3$–$C_{12}$-α-olefin, wherein poly-$C_3$–$C_{12}$-α-olefin chains are formed in the catalytically active titanium groups and wherein a poly-$C_3$–$C_{12}$-α-olefin is formed.

2. A process according to claim 1, wherein in step ii) the internal donoration product is brought into contact with at least one eluant which only partly removes the more soluble donor, and wherein the catalyst has at least catalytically active titanium groups, the said first amount of the less soluble internal donor and the said second amount which comprises more soluble internal donor and external donor in equilibrium, and the said eluant maintaining the equilibrium.

3. A process according to claim 1, wherein in step A)
   i') The support comprising magnesium cholride, a derivative thereof or a reagent forming it is brought into contact with at least:
      titanium tetrachloride or a reagent forming it;
      a first separate amount of the less soluble internal donor or a reagent forming it; and
      a second separate amount of the more soluble internal donor or a reagent forming it, in order to produce an internally donorated and titanated support which has the said first amount of the less soluble internal donor and the said second amount of the more soluble internal donor, and
   ii') the internally donorated and titanated support is brought into contact with at least a group 1, 2 or 13 metal compound which contains a $C_1$–$C_{10}$-alkyl and activates titanium tetrachloide to a catalytically active titanium group with at least one eluant, which may be the group 1, 2 or 13 metal compound which contains said $C_1$–$C_{10}$-alkyl, and with at least one external donor or a reagent forming it, in order to produce a catalyst system which contains at least catalytically active titanium groups, the said first amount of the less soluble internal donor and the said second amount which comprises said external donor.

4. A process according to claim 1, wherein the proportion of purely isotactic and larger-molecule material in the poly-$C_3$–$C_{12}$-α-olefin product of step B) which contains it and a less isotactic and smaller-molecule material is adjusted by means of the ratio of the amount of the less soluble internal donor to the amount of the more soluble internal donor of step i) or i') so that with larger proportions of the less soluble internal donor a larger proportion of purely isotactic and larger-molecule material is obtained.

5. A process according to claim 1, wherein the proportion of the isotactic material in the form of chain sequences in the less isotactic and smaller-molecule material of the poly-$C_3$–$C_{12}$-α-olefin product of step B) is adjusted in step ii) or ii') by means of the ratio of the amount of the external donor to the amount of the eluant so that with a larger amount of the external donor in proportion to the eluant a larger proportion of isotactic and larger-molecule material in the form of sequences is obtained.

6. A process according to claim 1, wherein the molecular weight of the less isotactic and smaller-molecule material of the poly-$C_3$–$C_{12}$-α-olefin of step B) is adjusted in step B) by means of hydrogen and/or the temperature so that with a lower amount of hydrogen and a lower temperature a higher molecular weight is obtained.

7. A process according to claim 1, wherein the more soluble internal donor of step A) is a di-$C_8$–$C_{16}$-alkyl ester of an organic dicarboxylic acid selected from the group consisting of dioctyl phthalate, dinonyl phthalate, didecyl phthalate, diundecyl phthalate, didodecyl phthalate, ditridecyl phthalate and ditetradecyl phthalate.

8. A process according to claim 1, wherein the said controlled amounts of the less soluble and the more soluble internal donor are produced by carrying out the said transesterification in a limited manner, in which case the unreacted amount of di-$C_7$–$C_{20}$-alkyl phthalate will form the said amount of the more soluble donor.

9. A process according to claim 8, wherein the limited transesterification is carried out by adjusting the ratio of the complex to the di-$C_7$–$C_{20}$-alkyl phthalate, the reaction temperature, and/or the pressure.

10. A process according to claim 1, wherein in step A) the molar ratio of the less soluble plus the more soluble internal donor to magnesium is within a range of 0.10–0.50.

11. A process according to claim 1, wherein the said at least one eluant of step ii) of step A) is an organic substance which elutes the more soluble internal donor but does not elute the less soluble internal donor.

12. A process according to claim 11, wherein the eluant is a tri-$C_1$–$C_{10}$-alkylaluminum.

13. A process according to claim 1, wherein the said external donor is a Lewis base partly soluble in a hydrocarbon.

14. A process according to claim 1, wherein the magnesium chloride comprised by the support of step A) is βmagnesium chloride.

15. A process according to claim 1, wherein in the magnesium dichloride-alcohol complex formula $$MgCl_2 \cdot nROH \qquad (I)$$

n is approximately 3, this complex being reacted in step A) with at least titanium tetrachloride or a reagent forming it.

16. A process according to claim 15, wherein in step A) an excess of titanium tetrachloride or a reagent forming it is used in order to rinse off the reaction byproducts of the complex and the titanium tetrachloride or the reagent forming it.

17. A process according to claim 1, wherein in step A) several steps are carried out, in the first of which the support is brought into contact with titanium tetrachloride or a reagent forming it and with the less soluble internal donor or a reagent forming it, in the second of which the solid material obtained from the first step is brought into contact with titanium tetrachloride or a reagent forming it and with the more soluble internal donor or a reagent forming it, and in the third of which the solid material obtained from the second step is brought into contact with titanium tetrachloride or some other washing solvent.

18. A process according to claim 1, wherein in step A) the molar ratio of the fed-in less soluble internal donor or reagent forming it to magnesium is within a range of 0.05–0.30.

19. A process according to claim 1, wherein in step A) the molar ratio of the fed-in more soluble internal donor or reagent forming it to magnesium is within a range of 0.05–0.30.

20. A process according to claim 1, wherein the molar ratio of the less soluble to the more soluble internal donor introduced in step i) or i') is within a range of 0.5–2.0.

21. A process according to claim 1, wherein in step A) there is used as the said group 1, 2 or 13 metal compound which contains a $C_1$–$C_{10}$-alkyl a compound which reduces and $C_1$–$C_{10}$-alkylates the titanium tetrachloride present in the magnesium chloride to a catalytically active titanium group.

22. A method for the preparation of a catalyst system intended for the polymerization of $C_3$–$C_{12}$-α-olefins, wherein the preparation is carried out by the procedure described in claim 1.

23. A catalyst system intended for the polymerization of $C_3$–$C_{12}$-α-olefins, wherein it is prepared by the method according to claim 1.

24. A process according to claim 1, wherein ROH is ethanol, the di-$C_7$–$C_{20}$-alkyl phthalate is dioctyl phthalate, and the di-$C_1$–$C_4$-alkyl phthalate is diethyl phthalate.

25. A process according to claim 7, wherein $C_7$–$C_{20}$-alkyl ester of an organic carboxylic acid is dioctyl phthalate.

26. A process according to claim 10, wherein in step A) the molar ratio of the less soluble plus the more soluble internal donor to magnesium is within a range of 0.15–0.30.

27. A process according to claim 11, wherein the said at least eluant of step ii) of step A) is an organic substance which elutes an excess of the group 1, 2 or 13 metal compound containing a $C_1$–$C_{10}$-alkyl used for the activation of titanium tetrachloride in step A), and does not participate in the activation of the coordinated titanium tetrachloride to a catalytically active titanium group.

28. A process according to claim 12, wherein the eluant is triethylaluminum.

29. A process according to claim 13, wherein the said external donor is a hydrocarbyl-oxysilane.

30. A process according to claim 13, wherein the said external donor is a cyclohexyl-methyl-dimethoxysilane.

31. A process according to claim 16, wherein the molar ratio of Ti/Mg is in the range of 1–100.

32. A process according to claim 16, wherein the molar ratio of Ti/Mg is in the range of 10–25.

33. A process according to claim 18, wherein the molar ratio of the fed-in less soluble internal donor or reagent forming it to magnesium is within a range of 0.10–0.20.

34. A process according to claim 19, wherein the molar ratio of the fed-in more soluble internal donor or reagent forming it to magnesium is within a range of 0.10–0.20.

35. A process according to claim 20, wherein the molar ratio of the less soluble to the more soluble internal donor introduced in step i) or i') is within a range of 0.7–1.3.

36. A process according to claim 21, wherein the compound which reduces and $C_1$–$C_{10}$-alkylates the titanium tetrachloride present in the magnesium chloride to a catalytically active titanium group is a tri-$C_1$–$C_2$-alkylaluminum compound.

37. A process according to claim 21, wherein the compound which reduces and $C_1$–$C_{10}$-alkylates the titanium tetrachloride present in the magnesium chloride to a catalytically active titanium group is a tri-$C_1$–$C_2$-triethylaluminum.

\* \* \* \* \*